B. F. TEAL.
SPEED AND TIME RECORDER.
APPLICATION FILED SEPT. 13, 1906.
1,046,346.
Patented Dec. 3, 1912.
3 SHEETS—SHEET 1.
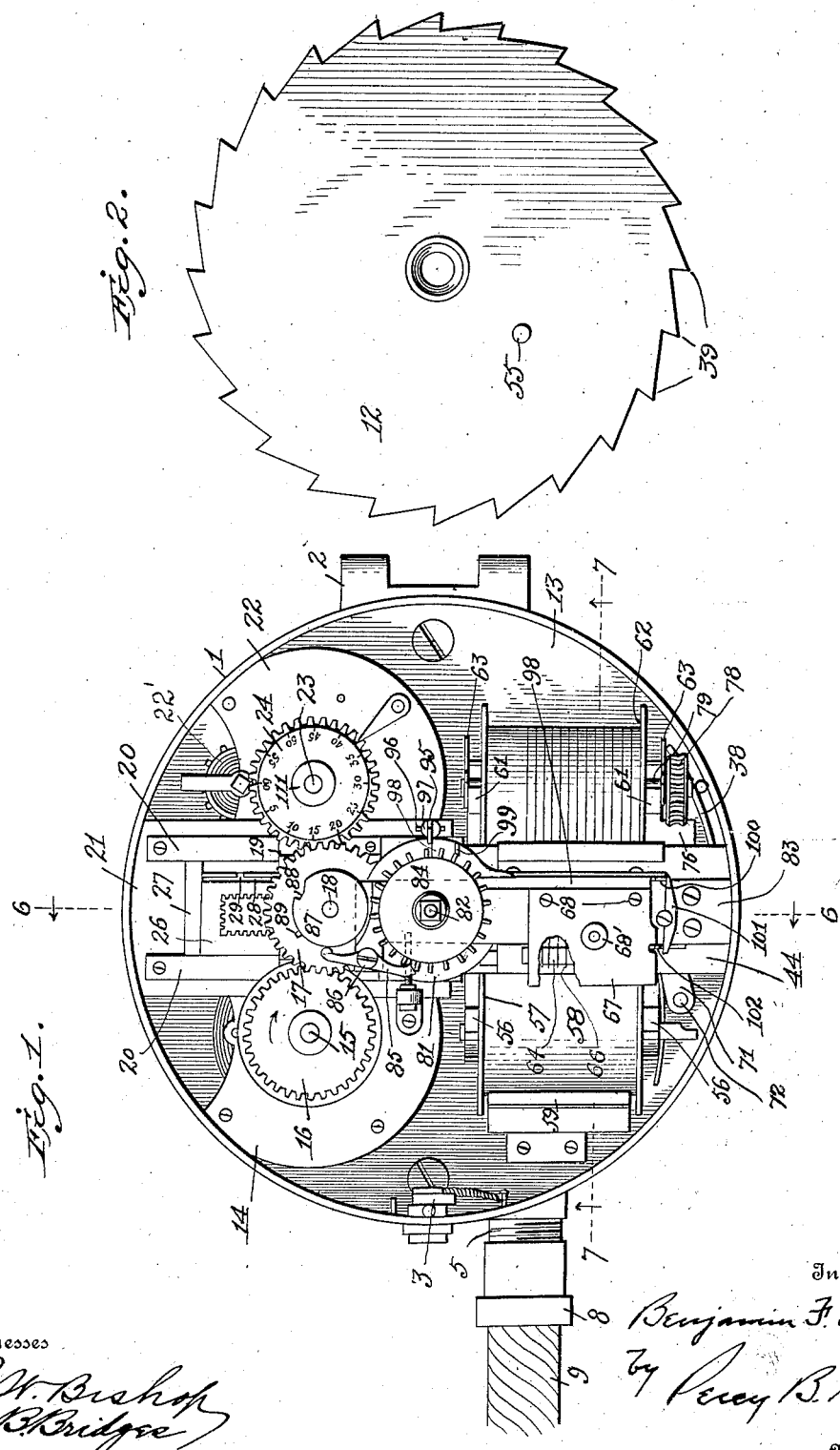

B. F. TEAL.
SPEED AND TIME RECORDER.
APPLICATION FILED SEPT. 13, 1906.
1,046,346.
Patented Dec. 3, 1912.
3 SHEETS—SHEET 2.
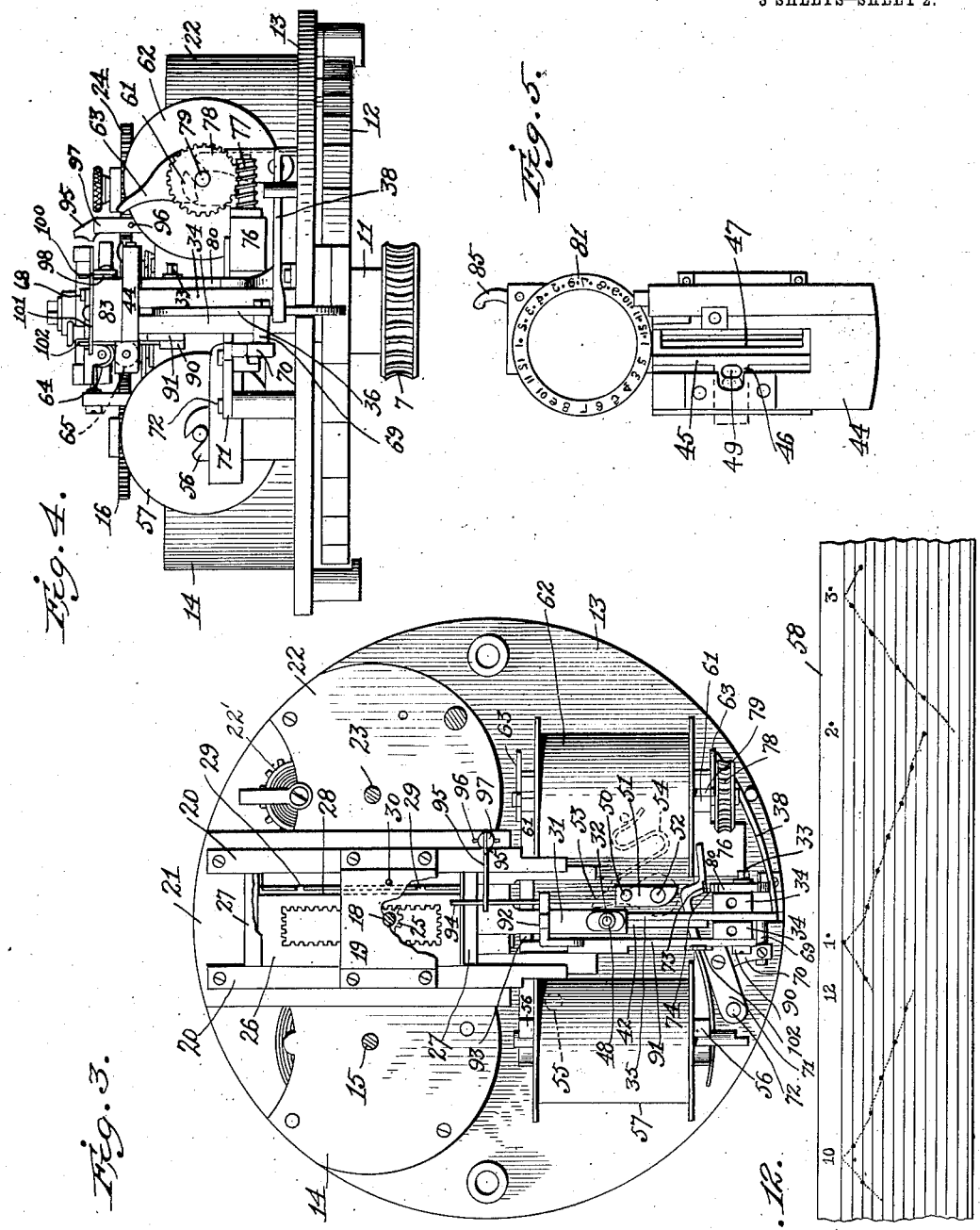

B. F. TEAL.
SPEED AND TIME RECORDER.
APPLICATION FILED SEPT. 13, 1906.
1,046,346.
Patented Dec. 3, 1912.
3 SHEETS—SHEET 3.
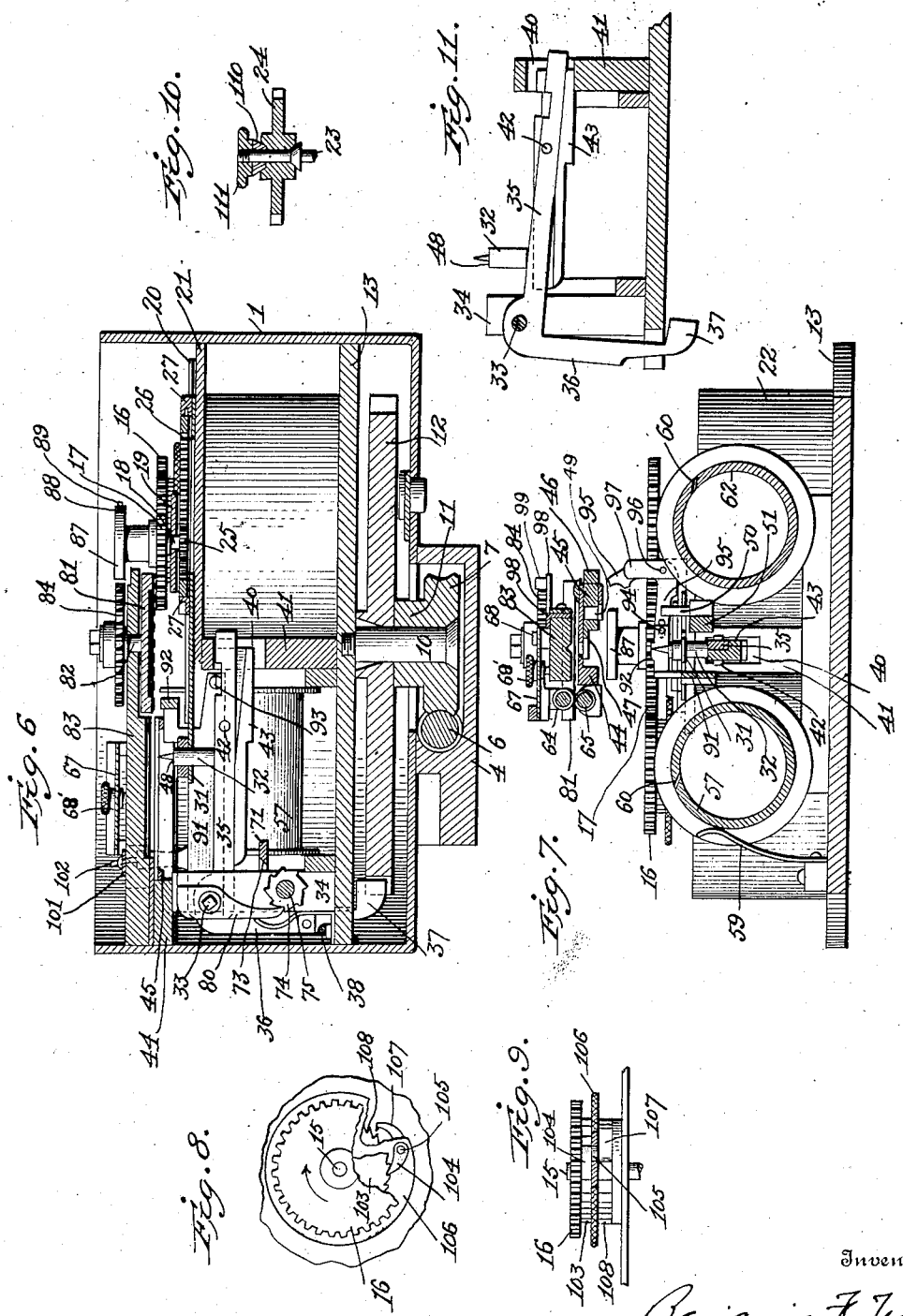

UNITED STATES PATENT OFFICE.

BENJAMIN FRANKLIN TEAL, OF GLENSIDE, PENNSYLVANIA.

SPEED AND TIME RECORDER.

1,046,346.  Specification of Letters Patent.  Patented Dec. 3, 1912.

Application filed September 13, 1906. Serial No. 334,488.

*To all whom it may concern:*

Be it known that I, BENJAMIN FRANKLIN TEAL, a citizen of the United States, residing at Glenside, in the county of Montgomery, State of Pennsylvania, have invented new and useful Improvements in Speed and Time Recorders, of which the following is a specification.

My invention relates to mechanism for recording the movements of devices such as automobiles and other vehicles, rotating shafting of all kinds, the speed of marine and stationary engines, of steam locomotives and electrically propelled cars, and all similar devices, and has for its object to provide certain improvements in the same as will be hereinafter more particularly described and claimed, reference being had to the accompanying drawings, in which:

Figure 1 is a top plan view of my improved apparatus, the lid of the casing being removed. Fig. 2 is a detail view of the cam-wheel. Fig. 3 is a view similar to Fig. 1, removed from the casing, with some of the mechanism in the upper part of the apparatus removed. Fig. 4 is a side elevation of the apparatus, removed from the casing. Fig. 5 is a detail bottom plan view of the hour printing wheel and the plate carrying the same. Fig. 6 is a vertical sectional view, taken on the general line 6—6, Fig. 1, but in an irregular path. Fig. 7 is a vertical sectional view, taken on the line 7—7, Fig. 1, a part of the mechanism being shown detached and elevated. Figs. 8, 9, 10 and 11 are detail views of various parts of the mechanism. Fig. 12 illustrates a section of a recording surface showing the marking of the perforating needle thereon.

Similar numerals of reference denote corresponding parts in the several views.

In the said drawings the reference numeral 1 denotes the casing of the apparatus, the same being provided with a suitable cover, not shown, hinged thereto at 2, and adapted to be retained and locked in its closed position, preferably water-tight, by a suitable lock 3.

Permanently bolted to the underside of the casing 1 is a casing-plate 4, inclosing and forming a water-tight bearing for the shaft 5, which is formed into a worm shaft 6 at its inner end, engaging and operating a worm wheel 7, and preferably screw-threaded at its outer end to receive the coupling 8 of a flexible shaft 9 that is rotated from the moving part of the device to be recorded, such, for instance, as the hub of a vehicle, in any suitable manner. The worm-wheel 7 is mounted to freely rotate on a spindle 10, and is formed with a hub 11 extending through the base of the casing 1 and carries a cam-wheel 12 at its inner end. The inner end of said spindle 10 is screwed into a base-plate 13 fixed in the casing 1 above the cam wheel 12.

Mounted on the base plate 13 is the motive power of the apparatus, for which I prefer to employ a clock-train 14 with the escapement mechanism removed, said clock train being preferably an eight-day mechanism. Connected to the minute hand staff 15, in a manner hereinafter described, is a gear wheel 16 meshing in turn with a similar gear wheel 17 mounted on a stud 18 carried by a cross plate 19 fixed to longitudinal guide bars 20, that are in turn mounted on a carrying plate 21 forming part of the framework of the mechanism. On the side of gear wheel 17 opposite to the driving gear wheel 16 is mounted on the base plate 13 another clock train 22, the same being also preferably of the eight-day variety, and being provided with the usual escapement mechanism 22'. Fixed to the minute hand staff 23 of said clock train 22 is a gear wheel 24 similar to gear wheel 16, and also meshing with gear wheel 17, said clock train 22 thus serving, through its escapement mechanism, to synchronize the movement imparted to gear wheel 17 from driving gear wheel 16. The spring of clock train 14 thus exerts its tension freely on gear wheel 17, but said gear wheel is controlled accurately in its movement by clock train 22 to rotate once an hour. The upper surface of gear wheel 24 may be marked with the minutes, as shown in Fig. 1, to indicate the position of the mechanism.

Mounted on the stud 18 of gear wheel 17, and beneath the cross plate 19, is a small pinion gear wheel 25, that in turn meshes with an oblong rectangular internal rack formed in a rack plate 26 laterally movable in cross guide bars 27, and longitudinally movable, together with said cross bars 27, in the guide bars 20 mounted on carrying plate 21, said small gear wheel 25 being of a diameter too small to engage the opposite longitudinal rack teeth of rack plate 26 at the same time, as seen in Fig. 3, and said diameter of said gear wheel 25 being, moreover, so proportioned to the diameter of gear wheel 17 that it will move rack plate 26 longitudinally in guide bars 20 once from end to end in one direction for each complete rotation of gear wheel 17. In one side of rack plate 26 is formed a longitudinal slot 28 and two openings 29 to the outer edge thereof, into and out of which plays a fixed pin 30 on the underside of cross plate 19, the operation being such that as rack plate 26 reaches each extreme of its movement, gear wheel 25 by its engagement with the transverse teeth at the ends of the oblong rectangular rack will shift said rack plate laterally in cross guide bars 27, the pin 30 at the same time registering with one or the other of openings 29 to permit said lateral movement, and said gear wheel 25 will be thus alternately placed in mesh with the opposite longitudinal rack teeth of rack plate 26, and will thus reciprocate rack plate 26 in its guide bars 20, the pin 30 maintaining said rack plate in fixed relation transversely, by its engagement either in slot 28 or against the outer edge of rack plate 26, until the shift transversely at each end of its movement occurs.

Mounted to move freely vertically in a bar 31 fixed to and reciprocated with rack plate 26, is a puncturing marker 32, to be more particularly hereinafter described.

As best seen in detail in Figs. 6 and 11, there is pivoted at 33 in two vertical standards 34, rising from the base plate 13, a bent lever comprising an upper longitudinal arm 35, a vertical portion 36, and a lower horizontal arm 37. Said lever is normally forced inward toward standards 34, below its pivot 33, by a strong spring 38, and has its lower horizontal arm 37 in constant contact with the cammed periphery 39 of cam-plate 12, as shown in Fig. 6. The inner end of the upper horizontal arm 35 is guided vertically in a slot 40 formed in a standard 41 mounted on base plate 13, and pivoted to said arm 35 intermediate its length at 42, is an arm 43, whose inner end also lies in slot 40 of standard 41, and which is recessed at one side to receive said arm 35, as best seen in Figs. 6, 7 and 11. Said arms 35 and 43 lie in the path of travel of marker 32, which, as shown in Fig. 7, rests half on each of them, and thus receives the impact of each of them when arm 37 is suddenly released by passing one of the cams 39 of cam-plate 12. Said arms thus form a compound lever that, as best shown in Fig. 11, will impart to the marker 32 approximately the same stroke or blow no matter what its position may be longitudinally with respect to said arms.

In order that the marker 32 may impart normally a series of light punctures or blows, and at predetermined intervals a deeper puncture, I provide the following mechanism: As best seen in Figs. 5 and 7, I mount in the underside of a top plate 44 a transversely sliding stop plate 45 having a guiding tongue 46, said stop plate when in the position shown in Fig. 5 having its inner edge 47 overlying one edge of the shoulder 48 formed on the body of the marker 32, so that with plate 45 in this position the blows imparted to said marker 32 will be checked by the contact of shoulder 48 thereon with said plate 45. Said plate 45 is apertured at 49 to receive a pin 50 mounted on an arm 51 pivoted on a vertical rock shaft 52 extending through base plate 13 and fixed to a cam 53 on the underside of said plate 13, shown in dotted lines in Fig. 3, said cam being pressed in one direction by a spring 54 and having its free end lying in the path of travel of a pin 55 fixed to the upper side of cam wheel 12. Said cam wheel 12 is preferably so geared with the vehicle wheel hub as to be rotated once for every mile traveled, and said pin 55 will therefore contact with said cam 53 once for every mile traveled. Said contact will shift said cam, and through rock shaft 52, arm 51 and pin 50, will shift stop plate 45 to the position shown in Fig. 7 out of the path of vertical movement of shoulder 48 on marker 32, and will maintain the parts in said shifted position during the passage of one of the cam teeth 39 on cam-wheel 12 past the arm 37 of the bent lever, whereby one puncturing impulse or blow will be given to the marker 32 with the parts in said position. This impulse or blow being unchecked by the stop plate 45 will necessarily be a much deeper puncture in the recording tape, hereinafter described, and will thus register the travel of a mile. The passage of pin 55, past cam 53 will release the latter, and the same, together with stop plate 45, will be returned to its normal position by spring 54.

Mounted in suitable brackets 56 rising from the base plate 13 is a record tape delivering drum 57, against the tape 58 mounted thereon impinges a spring 59 to control the delivery of the tape therefrom, the only peculiarly novel feature of construction of said drum being a slot 60 arranged in and passing completely through the wall of its body to receive and retain the end of the tape, said slot being disposed at an angle to the diameter of said drum, in order to more easily receive and more securely retain the tape end, as best seen in Fig. 7. On the other side of the marker 32 is mounted, in brackets 61, a similarly slotted receiving drum 62, a pair of pivoted retaining jaws 63 serving to removably retain the axis of said drum in position. The said tape is placed upon the drum 57 with its surface unmarked, but during its passage between the small rollers 64 and 65 freely mounted in the top frame of the apparatus, and because of the fact that the roller 64 is provided on its periphery with a series of scoring ribs 66, best seen in Fig. 1, that register with similar grooves in the roller 65, said tape 58 becomes scored longitudinally to mark say five minute divisions of time transversely on said tape. In order that the pressure of roller 64 may be adjusted I mount its bearings in the free edge of a flat spring plate 67 secured at 68 to the top frame and provide therein an adjusting screw 68' tapped into said top frame.

The mechanism for feeding the tape 58 is best seen in Figs. 3, 4 and 6, and consists of a horizontal pin 69 fixed to the vertical portion 36 of the cam lever below its pivot 33, said pin 69 connecting, by means of a link 70, with an actuating pawl 71 pivoted at 72 to the base plate 13, and having a knife edge 73 near its free end lying in the path of engagement with a ratchet wheel 74, that is in turn mounted on one end of a shaft 75 rotatable in a bearing 76 supported from one of the standards 34, said shaft 75 being formed at its other end into a worm shaft 77 in engagement with a worm wheel 78 mounted on one end of the shaft 79 of drum 62, a spring-pressed stop-pawl 80 also engaging said ratchet wheel 74. With this mechanism it will be obvious that each impulse imparted to the lower horizontal arm 37 of the bent lever by the cam wheel 12 will rotate ratchet wheel 74 one tooth, and will thereby similarly rotate drum 62, and as I have provided cam wheel 12 with twenty-four cam teeth 39, the tape 58 will be fed intermittently once for every twenty fourth of a mile traveled by the vehicle.

The mechanism for printing the hours on the tape 58 is as follows: A printing wheel 81 is mounted on a spindle 82 on the underside of the top plate 83, said wheel being provided on its underside near its periphery with type indicating the twenty-four hours of a day, the p. m. hours being preferably distinguished from the a. m. hours by dots placed after the same, as best seen in Fig. 5, and said wheel overlying at one edge the margin of the tape 58. Fixed to the spindle 82 on the upper side of top plate 83 is a toothed wheel 84, by which the printing wheel 81 is rotated. The movement of this toothed wheel is controlled by a springless pawl 85, pivoted at 86 and having one end engaging the teeth of wheel 84 and its other end in contact with the periphery of a cam wheel 87 mounted on the staff 18 of gear wheel 17, as best seen in Fig. 1, and being provided with a cam recess 88 and a projecting pin 89 in its periphery, the two being so positioned relatively that the recess 88 will register with the end of pawl 85 just as pin 89 engages one of the teeth of wheel 84. Now as the cam wheel 87 is rotated with gear wheel 17 once an hour, it follows that once an hour pin 89 thereon will engage with and rotate wheel 84 and printing wheel 81 the space of one tooth of wheel 84, and as the latter has twenty-four teeth, corresponding with the type on wheel 81, said type will be successively presented to the printing point hereinafter described. The operation of the pawl 85 will be obvious, the same by dropping in recess 88, as the pin 89 contacts with a tooth of wheel 84, releasing the tooth engaged by its other end to permit the rotation of wheel 84, and as it rides out of recess 88 being again forced into holding engagement with the teeth of wheel 84.

Pivoted at 90 to one of the standards 34 of the frame is a lever 91, the same extending inward parallel with the compound lever 35, 43, and having fixed at its inner end a transverse bar 92 passing beneath the type surface of printing wheel 81, and forming a printing hammer, as best seen in Figs. 1 and 3. Also fixed to said lever 91, and passing transversely over the compound lever 35, 43, is an actuating bar 93 adapted to receive impulses from said compound lever, as hereinafter described. The bar 92 carries at its free end a rod 94 fixed at a right angle thereto, which passes freely through an aperture in the lower horizontal end of a bell crank lever 95, pivoted at 96 in a standard 97. The upper end of said lever 95 is movable into and out of engagement with a sliding plate 98 formed angular to engage the top plate 83, as best seen in Fig. 7, said plate being curved outward to reach said lever 95, as seen in Fig. 1, and carrying on its upper surface a lug 99 adapted to engage the teeth of wheel 84. The other end of this sliding plate has a projecting end 100 adapted to contact with one end of a lever 101 pivoted intermediate its length on top plate 83 and contacting at its other end with a vertical arm 102 fixed to the lever 91. Normally the sliding plate 98 is pushed inward, and the upper end of bell crank lever 95 contacts against the side of said plate, thus keeping its upper end away from wheel 84 and raising its lower end, which in turn raises rod 94 and actuating bar 93, the latter being thus out of the limit of movement of compound lever 35, 43, and receiving no impulse when the latter is actuated. But when the printing wheel 81 and toothed wheel 84 are actuated a step through pin 89 on cam wheel 87, which occurs once an hour, one of the teeth of wheel 84 contacts with the lug 99 on sliding plate 98, thus forcing the latter outward and releasing the upper arm of bell crank lever 95, which permits the parts to assume the position shown in Figs. 1 and 6 wherein the actuating bar 93 is in contact with the compound lever 35, 43 in position to receive an impulse therefrom when next operated by cam wheel 12. The result of this next impulse imparted to the compound lever is that through the rigid connection between actuating arm 93, lever 91 and printing hammer 92 the latter forces the overlying tape against that type on wheel 81 that happens to be at the printing point, thereby imparting the impression thereof to the tape. At the same time the upper end of arm 102 fixed to lever 91 is forced outward, thereby rocking lever 101 on its pivot, which forces in the sliding plate 98, and as the upper end of bell crank lever 95 has been simultaneously moved outward away from the path of travel of said sliding plate, the latter will resume its initial position ready for a fresh impulse from the teeth of wheel 84. It will thus be seen that once an hour the tape is printed with said hour, but only if the vehicle is in motion.

In order that the gear wheel 16 may be temporarily disconnected from the staff 15 of the driving clock train 14, for the purpose of setting to the correct time, I provide the following mechanism, shown in detail in Figs. 8 and 9: Said gear wheel 16 is mounted to rotate freely on staff 15, and has fixed to its underside a ratchet wheel 103, with which is adapted to engage a pawl 104 pivoted on a shaft 105 carried by a pawl disk 106 that is fixed to staff 15. Also fixed to staff 105, on the underside of disk 106 is a hooked pawl 107, that is adapted to engage a ratchet wheel 108 that is fixed to the top plate of the driving clock train 14. Said pawls 104 and 107 are so adjusted that while one of them is completely engaged with its ratchet wheel the other will be disengaged from its ratchet wheel, though, at the same time, they cannot both be disengaged at once. With the parts in the position shown in Fig. 8, the pawl 104 is in engagement with its ratchet wheel 103 and the pawl 107 disengaged, the power of the driving train 14 being thus applied to the gear wheel 16. Now, when it is desired to disconnect gear wheel 16, the pawl disk 106, which is a little greater in diameter than gear wheel 16, and has its edge milled, is rotated manually against the tension of the driving train 14 to a slight degree, which results in pawl 104 being forced outwardly, and in pawl 107 being correspondingly forced inwardly to engage its ratchet wheel 108. The driving train will thus be held by pawl 107 against running down, and the gear wheel 16 will be free to be rotated. To restore the parts to their normal position it is only necessary to again move pawl disk 106 slightly against the tension of the driving train, when the operation will be reversed and the pawl 104 restored to its engaging position and the pawl 107 disengaged, it being apparent that as at no time are both pawls simultaneously disengaged, there will never be any danger of the driving train being released to run down. In order to adjust the parts when the gear wheel 16 is released, it is necessary that gear wheel 24 on synchronizing clock train 22 be also released from its staff 23, and this I prefer to accomplish, as shown in detail in Fig. 10, by providing said staff 23 with a coned seat 109 against which the hub of gear wheel 24 contacts, a similar coned seat 110 being formed on the clamping nut 111, between which cones the gear wheel 24 may be securely held to rotate with staff 23, and yet may be readily loosened to rotate independently.

Briefly stated, the operation of the device is as follows: The parts being first adjusted to correspond with the time of day or night, and the pawl 104 into engagement with ratchet wheel 103, the gear wheel 16 is placed under the tension of driving train 14 freely exerted thereon, which tension is communicated to gear wheels 17 and 24, the latter, through its escapement-controlled clock train 22, causing the gear wheels to rotate synchronously with the hour staff 23 thereof. This rotation of gear wheel 17 is imparted to reciprocating rack plate 26, and through the latter to the marker 32, said rack plate and marker occupying one hour in their reciprocation in each direction, which causes said marker 32 to cross the tape 58 transversely once an hour. With the vehicle at rest, this movement, together with a feed of toothed wheel 84 and printing wheel 81 one step an hour, as hereinbefore described, will constitute the operation of the device; but with the vehicle in motion, which is communicated to cam wheel 12 through flexible shaft 9, an impulse will be imparted to the bent lever formed of the parts 35, 36 and 37 once for every cam tooth 39 of cam wheel 12, and as said cam plate is geared to rotate once for every mile traveled, said impulses will be imparted every twenty fourth of a mile traveled. Each of said impulses imparts a puncturing impulse to marker 32, and the blow imparted is, through the operation of compound lever 35, 43, approximately the same no matter what position said marker may occupy longitudinally with respect to said compound lever. The penetration of said marker 32 through the tape 58 is controlled to the same depth by the stop plate 45 except once for every mile traveled, when, through the pin 55 and the intermediate connections, hereinbefore described, said stop plate 45 is temporarily withdrawn from the path of the shoulder 48 on marker 32, and the latter permitted to make a deeper, and, owing to its conical point, a larger puncture, thus recording on the tape the miles traveled. The said tape while introduced into the device plain, is scored longitudinally by the rollers 64 and 65 to indicate five minute divisions of time, and once every hour, while the vehicle is in motion, said hour is impressed on the inner margin of the tape by the printing wheel 81 and printing hammer 92, through the mechanism hereinbefore described. It will thus be seen that with a recording tape controlled in its feed by the movement of the vehicle, a light puncture is made thereon once every twenty fourth of a mile traveled, by a marker reciprocated across said tape once an hour synchronously with the movement of a clock train; that once an hour said hour is impressed on said tape, provided the vehicle is moving; and that for every mile traveled a larger puncture is made by said marker in said tape.

I have illustrated in Fig. 12 a section of a tape showing a record. This record shows that the vehicle started at 9.40 a. m. running at about four miles an hour until 10.05 a. m. when the speed increased to about twelve miles an hour, until 10.35, when the vehicle stopped after running almost six miles, said miles being indicated by the deeper perforations. The vehicle started again at 12.45 p. m., running at the rate of about ten miles an hour, which speed was increased at 1.10 p. m. to about twelve miles an hour, which was kept up until 1.38 p. m., when the vehicle again stopped. Running was again resumed at about 2.08 p. m., the speed varying between four and six miles an hour until 3.10 where the record ends.

While I have described my invention as particularly applicable to vehicles for recording the running of the same, I wish it to be understood that I do not limit myself to such use, as the device may be applied to any form of moving machinery, such as shafting, stationary and marine engines, and the like. I also wish to be understood not to limit myself to the exact details of construction shown and described, as the same may be varied in many particulars without departing from the spirit of my invention.

Having thus described my invention, what I claim as new and desire to secure by Letters Patent is:

1. In an apparatus of the character described, movable marking parts, a spring motor train connected directly with said movable marking parts and unchecked as to the application of its power, and a second spring motor train having an escapement mechanism and also directly connected to said movable marking parts to control the movement of said parts under the influence of said unchecked spring motor train.

2. In an apparatus of the character described, a record surface carrier, means for moving the same, a marker, means for causing said marker to reciprocate across the contact area consisting of a longitudinally and laterally movable rack plate having an oblong rectangular internal rack, a gear wheel for driving said rack plate, and means for driving said gear wheel.

3. In an apparatus of the character described, a record surface carrier, means for moving the same, a marker, means for causing said marker to reciprocate across the contact area consisting of a rack plate capable of longitudinal and transverse movement and having an oblong rectangular internal rack, a gear wheel meshing with said rack, means for driving said gear wheel, and means whereby said rack plate is automatically shifted by said gear wheel at each extreme of its reciprocation to cause said gear wheel to move it in the opposite direction.

4. In an apparatus of the character described, a record surface carrier, means operated by the movement of the device the speed of which is to be recorded for intermittingly moving said record surface carrier, a marker, and a time movement for varying the position of said marker with respect to the contact area.

5. In an apparatus of the character described, a record surface carrier, a marker, means for varying the position of said marker with respect to the contact area, and means operated by the movement of the device the speed of which is to be recorded for moving said record surface carrier and for imparting recording impulses to said marker.

6. In an apparatus of the character described, a record surface carrier, means operated by the movement of the device the speed of which is to be recorded for moving said record surface carrier, a marker, a time movement for constantly varying the position of said marker with respect to the contact area, and means operated by the movement of the device to be recorded for intermittently imparting recording impulses to said marker.

7. In an apparatus of the character described, a record surface carrier, a marker, means for varying the position of said marker with respect to the contact area, and means operated by the movement of the device the speed of which is to be recorded for imparting a step by step feed to said record surface carrier and for imparting a recording impulse to said marker.

8. In an apparatus of the character described, a record surface carrier, a marker, a time movement for constantly varying the position of said marker, and means operated by the movement of the device the speed of which is to be recorded for imparting a step by step feed to said record surface carrier and for imparting a recording impulse to said marker.

9. In an apparatus of the character described, a printing surface, a time movement, means for moving said surface synchronously with said time movement, a printing hammer, and means operated by the movement of the device the speed of which is to be recorded for actuating said printing hammer against said printing surface.

10. In an apparatus of the character described, a printing surface, a time movement, means for moving said surface intermittently and synchronously with said time movement, a printing hammer, and means operated by the movement of the device the speed of which is to be recorded for actuating said printing hammer against said printing surface not more than once for each movement of said printing surface.

11. In a device of the character described, a record surface carrier, means operated by the movement of the device the speed of which is to be recorded for moving said record surface carrier, a marker, a time movement for varying the position of said marker with respect to the contact area, a printing surface, means for moving said printing surface synchronously with said time movement, and means operated by the movement of the device to be recorded for printing from said printing surface.

12. In a device of the character described, a record surface carrier, a marker, a printing surface, a time movement for constantly varying the position of said marker and for moving said printing surface intermittently and synchronously therewith, and means operated by the movement of the device the speed of which is to be recorded for feeding said record surface and for printing from said printing surface.

13. In a device of the character described, a record surface carrier, a marker, a printing surface, a time movement for constantly varying the position of said marker and for moving said printing surface intermittently and synchronously therewith, and means operated by the movement of the device the speed of which is to be recorded for feeding said record surface, for printing from said printing surface, and for imparting recording impulses to said marker.

14. In a device of the character described, a record surface holder, a marker, a printing surface, a time movement for constantly varying the position of said marker and for moving said printing surface intermittently and synchronously therewith, and a common means operated by the movement of the device the speed of which is to be recorded for imparting a step by step feed to said record surface, for printing at intervals from said printing surface, and for imparting recording impulses to said marker.

15. In a device of the character described, a record surface holder, a marker, a printing surface, a printing hammer, a time movement for constantly varying the position of said marker and for moving said printing surface intermittently and synchronously therewith, and a common means operated at intervals by the movement of the device the speed of which is to be recorded for imparting a step by step feed to said record surface, for actuating at intervals said printing hammer against said printing surface, and for imparting recording impulses to said marker.

16. In a device of the character described, a pivoted lever, means for imparting impulses to said lever, and a marker contacting with said lever and shiftable toward and from its pivot, said marker receiving the impulses of said lever, and said lever being so constructed that impulses of approximately the same power will be imparted to said marker in all positions of said marker with respect to the pivot of said lever.

17. In a device of the character described, a pivoted compound lever, means for imparting impulses to said lever, and a marker contacting with said lever and shiftable toward and from its pivot, said marker receiving the impulses of said lever, and said lever being so constructed that impulses of approximately the same power will be imparted to said marker in all positions of said marker with respect to the pivot of said lever.

18. In a device of the character described, a marker, a lever on which said marker rests and on which it is adapted to be shifted longitudinally, said lever consisting of one arm pivoted at one end and to which impulses may be imparted, and a second arm pivoted intermediate its length to said impulse receiving arm, and a stop for the free ends of said arms, the construction being such that when said arms are depressed and then given an upward impulse said impulse will be imparted to said marker with approximately the same force no matter what may be the position of said marker longitudinally on said lever.

19. In a device of the character described, a puncturing marker, means for imparting marking impulses to said marker, and a stop movable into and out of the path of movement of said marker to vary the limit of marking movement of said marker toward the contact area but permitting a marking contact.

20. In a device of the character described, a puncturing marker, means for imparting marking impulses to said marker, a stop normally lying in the path of movement of said marker to limit its movement toward the contact area but permitting a marking contact, and means for withdrawing said stop from said path of movement to permit a further movement toward said contact area.

21. In a device of the character described, a puncturing marker, means for imparting marking impulses to said marker, a stop normally lying in the path of movement of said marker to limit its movement toward the contact area but permitting a marking contact, and means operated at intervals by the movement of the device to be recorded for withdrawing said stop from said path of movement to permit a further movement of said marker toward the contact area.

22. In a device of the character described, a puncturing marker, means for varying the position of said marker, means for imparting marking impulses to said marker, a stop plate normally lying in the path of marking movement of said marker in all of its positions of movement but permitting a marking movement, and means for withdrawing said stop plate at intervals from the path of marking movement of said marker to permit a further movement of said marker toward the contact area.

23. In a device of the character described, a record surface carrier, a marker, a lever receiving impulses at intervals from the movement of the device to be recorded and operating said marker, and connections between said lever and said carrier for imparting said impulses to said carrier, consisting of a pawl operated by said lever, a ratchet wheel engaged by said pawl, a shaft carrying said ratchet wheel and formed into a worm, and a worm gear in mesh with said worm and connected with said carrier.

24. In a device of the character described, a record surface carrier, means for marking a record on the record surface carried thereby, a pair of opposed rolls provided with means for marking longitudinal divisions on said record surface, and a common means for actuating said record marking means and for causing said rolls to mark, whereby said record will be in exact relation to said longitudinal markings.

25. In a device of the character described, a toothed wheel, a driving gear, connections between the two for imparting a step by step movement to said toothed wheel, a printing wheel movable with said toothed wheel, a printing hammer, means operated by the movement of the device the speed of which is to be recorded for actuating said printing hammer, and connections between said toothed wheel and printing hammer whereby the latter is normally retained out of operative position, is forced into operative position to receive a printing stroke from its actuating means each time said toothed wheel is actuated, and is returned to its normal inactive position upon receiving its printing stroke.

26. In a device of the character described, a driving spring, a gear wheel mounted loosely on the staff of said driving spring and meshing with connected gearing to impart motion thereto, and means for connecting and disconnecting said staff and gear wheel without releasing said driving spring.

27. In a device of the character described, a driving spring, a gear wheel mounted loosely on the staff of said driving spring and meshing with connected gearing to impart motion thereto, and means for connecting and disconnecting said gear wheel without releasing said driving spring consisting of a ratchet wheel fixed to said gear wheel, a pawl disk fixed to said driving spring staff, a ratchet wheel fixed to the driving spring casing, and two pawls fixed to a common shaft in said pawl disk, one being a straight pawl adapted to engage the gear wheel ratchet, and the other being a hooked pawl adapted to engage the driving spring casing ratchet, said pawls being so positioned that they cannot be simultaneously disengaged from their respective ratchets.

28. In a device of the character described, a record surface carrier, means operated by the movement of the device the speed of which is to be recorded for moving said carrier, a marker, a time movement for varying the position of said marker with respect to the contact area, and means operated by the movement of the device to be recorded for imparting recording impulses to said marker.

29. In a device of the character described, an hour recorder, a speed recorder, and a time movement for moving said recorders synchronously therewith.

In testimony whereof I have hereunto set my hand in the presence of two subscribing witnesses.

BENJAMIN FRANKLIN TEAL.

Witnesses:
JOSEPH J. LAWLESS,
MAMIE E. TOPHAM.